(12) United States Patent
Nishigai (10) Patent No.: US 10,263,428 B2
(45) Date of Patent: Apr. 16, 2019

(54) POWER CONVERSION APPARATUS, METHOD FOR CONTROLLING POWER CONVERSION APPARATUS, AND POWER CONVERSION SYSTEM

(71) Applicant: KYOCERA Corporation, Kyoto-shi, Kyoto (JP)

(72) Inventor: Takanobu Nishigai, Hiratsuka (JP)

(73) Assignee: KYOCERA Corporation, Kyoto (JP)

( * ) Notice: Subject to any disclaimer, the term of this patent is extended or adjusted under 35 U.S.C. 154(b) by 171 days.

(21) Appl. No.: 14/909,011

(22) PCT Filed: Jul. 28, 2014

(86) PCT No.: PCT/JP2014/003962
§ 371 (c)(1),
(2) Date: Jan. 29, 2016

(87) PCT Pub. No.: WO2015/015796
PCT Pub. Date: Feb. 5, 2015

(65) Prior Publication Data
US 2016/0172862 A1   Jun. 16, 2016

(30) Foreign Application Priority Data

Jul. 29, 2013  (JP) ................................. 2013-157061

(51) Int. Cl.
*H02J 1/00* (2006.01)
*H02J 3/38* (2006.01)
(Continued)

(52) U.S. Cl.
CPC ............... *H02J 3/383* (2013.01); *H02J 1/00* (2013.01); *H02J 3/381* (2013.01); *H02J 3/386* (2013.01);
(Continued)

(58) Field of Classification Search
CPC .. H02J 3/383; H02J 3/381; H02J 7/007; H02J 3/387; H02J 3/386; H02J 7/34; H02J 1/00;
(Continued)

(56) References Cited

U.S. PATENT DOCUMENTS 4,788,449 A * 11/1988 Katz ......................... H02J 1/10
                                                    136/244
5,297,015 A *  3/1994 Miyazaki ................. H02J 3/00
                                                    307/151
(Continued)

FOREIGN PATENT DOCUMENTS

EP    0 409 226 A2   1/1991
JP    H3-74143 A     3/1991
(Continued)

OTHER PUBLICATIONS

Extended European Search Report dated Feb. 15, 2017, issued by the European Patent Office in counterpart European Application No. 14 83 2604.4.
(Continued)

*Primary Examiner* — Adi Amrany
(74) *Attorney, Agent, or Firm* — Procopio Cory Hargreaves and Savitch LLP (57) ABSTRACT

In a power conversion apparatus that has adopted a DC-linkage system, the connection to a load is switched depending on the output characteristics of the power-supply device, to thereby flexibly operate power supply from each power source. The disclosed power conversion apparatus includes: a plurality of connection terminals for connecting the DC power-supply devices; a plurality of voltage transducers connected in series to the plurality of connection terminals; a plurality of DC power output lines electrically independent from one another; a switch for selectively connecting the plurality of voltage transducers and the plurality of DC
(Continued)

power output lines with each other; and a controller for controlling the switch, according to the operating state of at least either the plurality of DC power-supply devices or loads connected to the plurality of DC power output lines.

9 Claims, 9 Drawing Sheets

(51) Int. Cl.
    *H02M 1/00*        (2006.01)
    *H02J 7/34*         (2006.01)
    *H02J 7/00*         (2006.01)
    *H02M 3/04*        (2006.01)
    *H02M 7/44*        (2006.01)

(52) U.S. Cl.
    CPC .............. *H02J 3/387* (2013.01); *H02J 7/007* (2013.01); *H02J 7/34* (2013.01); *H02M 1/00* (2013.01); *H02M 3/04* (2013.01); *H02M 7/44* (2013.01); *H02J 2001/008* (2013.01)

(58) Field of Classification Search
    CPC ...... H02J 2001/008; H02M 7/44; H02M 3/04; H02M 1/00
    USPC .......................................... 307/18, 25, 28, 29
    See application file for complete search history.

(56) References Cited

U.S. PATENT DOCUMENTS

| | | | | |
|---|---|---|---|---|
| 6,037,752 | A * | 3/2000 | Glennon | F02N 11/04 307/19 |
| 7,112,896 | B2 * | 9/2006 | Kinnard | H02J 1/10 307/43 |
| 2010/0327808 | A1 | 12/2010 | Matsuura et al. | |
| 2012/0181990 | A1 | 7/2012 | Asakura et al. | |
| 2012/0235631 | A1 * | 9/2012 | Nakashima | H01M 14/005 320/107 |
| 2013/0025893 | A1 * | 1/2013 | Ota | H02J 1/10 173/2 |
| 2013/0207474 | A1 * | 8/2013 | Delay | H02J 3/383 307/72 |
| 2013/0320754 | A1 * | 12/2013 | Edelbrock | H02M 5/271 307/9.1 |
| 2014/0203639 | A1 * | 7/2014 | Rozman | H02J 1/00 307/28 |
| 2014/0217821 | A1 * | 8/2014 | Rozman | H02J 1/14 307/29 |
| 2016/0197481 | A1 * | 7/2016 | Nishigai | H02J 1/12 324/140 D |

FOREIGN PATENT DOCUMENTS

| | | |
|---|---|---|
| JP | 2002-101558 A | 4/2002 |
| JP | 2011-010448 A | 1/2011 |
| JP | 2011-019312 A | 1/2011 |
| JP | 2012-249432 | 12/2012 |
| WO | 2011/145939 A2 | 11/2011 |

OTHER PUBLICATIONS

International Search Report issued by Japan Patent Office for International Application No. PCT/JP2014/003962.
Written Opinion of the International Searching Authority issued by Japan Patent Office for International Application No. PCT/JP2014/003962.
Office Action dated Mar. 14, 2017 issued in counterpart Japanese Application No. 2015-529390.

* cited by examiner

POWER CONVERSION APPARATUS, METHOD FOR CONTROLLING POWER CONVERSION APPARATUS, AND POWER CONVERSION SYSTEM

CROSS REFERENCE TO RELATED APPLICATIONS

This application claims the benefit of International application number PCT/JP2014/003962 filed on Jul. 28, 2014, which claims priority to and the benefit of Japanese Patent Application No. 2013-157061 filed Jul. 29, 2013, the entire disclosure of which is incorporated herein by reference.

TECHNICAL FIELD

This disclosure relates to a power conversion apparatus having a plurality of inputs for DC power-supply devices, a method for controlling the power conversion apparatus, and a power conversion system.

BACKGROUND

A power control system is desired to centrally control and operate a plurality of power-supply devices including solar cells, storage batteries, fuel cells, wind power generators, and hydraulic generators. Particularly in recent years, aiming at facilitating control, improving efficiency, and reducing cost, a DC link system has been proposed in which various power-supply devices are connected without converting DC powers thereof. In the system, powers from solar cells and fuel cells are linked as DC powers and directly charged into a storage battery, and then converted into AC power using a single inverter, to thereby supply the power to a load. The DC link system eliminates the conventional need to convert respective outputs from the power-supply devices by inverters, and thus minimizes the conversion loss to thereby allow for improving efficiency. The DC link system also simplifies the system, which leads to cost reduction. Further, the DC link system links DC powers, with which power can be advantageously controlled with ease.

CITATION LIST

Patent Literature

PTL 1: JP 2012-249432 A

SUMMARY

Technical Problem

The DC link system, which may have the aforementioned advantages, links outputs from a plurality of power-supply devices, in a stage preceding the inverter. Accordingly, the DC link system has involved such problem as having difficulty in providing flexible operations such as selectively charging only power obtained from a solar cell among the power-supply devices into a storage battery or supplying power from a specific power-supply device to a specific load. Patent Literature (PTL) 1 (JP 2012-249432 A) discloses an example where multi-phase input AC powers are supplied to a load as being converted into multi-phase output AC power, but no description is given of any example which handles DC power.

Further, output voltage generally varies depending on the power-supply device. However, in the conventional DC link system, DC power from a plurality of power-supply devices must be stepped up to the same voltage. This increases high the step-up ratio for a power-supply device of lower output voltage, leading to a problem that a multi-stage voltage transducer has been needed.

It could therefore be helpful to provide a power conversion apparatus employing a DC link system, in which connections to loads are switched depending on the output characteristics of the power-supply devices, to thereby flexibly use powers supplied from the power-supply devices.

Solution to Problem

In order to solve the aforementioned problems, provided is a power conversion apparatus that may be connected with a plurality of DC power-supply devices, including:

a plurality of connectors that may be connected with the DC power-supply devices;

a plurality of voltage transducers connected in series with the plurality of connectors;

a plurality of DC power output lines electrically independent from one another;

a switching part for selectively connecting the plurality of voltage transducers and the plurality of DC power output lines with each other; and a controller configured to control the switching part, according to the operating state of at least either the plurality of DC power-supply devices or loads connected to the plurality of DC power output lines.

Further, the controller may preferably control the switching part such that each of the plurality of voltage transducers is connected to only one line of any of the plurality of the DC power output lines.

Further, the voltage transducer connected to the same DC power output line of the plurality of DC power output lines may preferably convert voltage from the DC power-supply devices connected thereto, so as to have the same DC output voltage.

Further, the voltage transducers may preferably be controlled such that the voltage transducers connected to different DC power output lines of the plurality of DC power output lines may have different DC output voltages.

Further, the plurality of DC power-supply devices may preferably include a power generation device and a power storage device; and the controller may preferably control the switching part to connect the power generation device and the power storage device to the same DC power output line of the plurality of DC power output lines and charge power from the power generation device to the power storage device.

Further, in order to solve the aforementioned problems, provided is a method for controlling a power conversion apparatus that may be connected with a plurality of DC power-supply devices, the method including:

a voltage conversion step of voltage-converting output power of the plurality of DC power-supply devices thus connected;

a connecting step of selectively connecting, to a plurality of DC power output lines, output of the converted voltage converted in the voltage conversion step; and a switching step of switching the connection between the output of the converted voltage and the plurality of DC power output lines, according to the operating state of at least either the plurality of DC power-supply devices or loads connected to the plurality of DC power output lines.

Further, the plurality of DC power-supply devices may preferably include a power generation device and a power storage device;

the switching step may preferably is the step of switching, according to a charge starting operation of the power storage device, the power generation device and the power storage device to be connected to the same DC power output line of the plurality of DC power output lines, the method further includes a charging step of charging power from the power generation device to the power storage device.

Further, the method may preferably further include an initializing step of initializing connection between the output of the converted voltage and the plurality of the DC power output lines.

Further, in order to solve the aforementioned problems, provided is a power conversion system including a plurality of DC power-supply devices and a power conversion apparatus, the power conversion apparatus including:

a plurality of connectors that may be connected with the DC power-supply devices;

a plurality of voltage transducers connected in series with the plurality of connectors;

a plurality of DC power output lines electrically independent from one another;

a switching part for selectively connecting the plurality of voltage transducers and the plurality of DC power output lines with each other; and a controller configured to control the switching part, according to the operating state of at least either the plurality of DC power-supply devices or loads connected to the plurality of DC power output lines.

Advantageous Effect

The disclosed power conversion apparatus may be flexibly designed and operated, and may be simplified in configuration without the need for a multi-stage voltage transducer.

DETAILED DESCRIPTION

In the following, embodiments of this disclosure are described with reference to the accompanying drawings.

Figure 1:
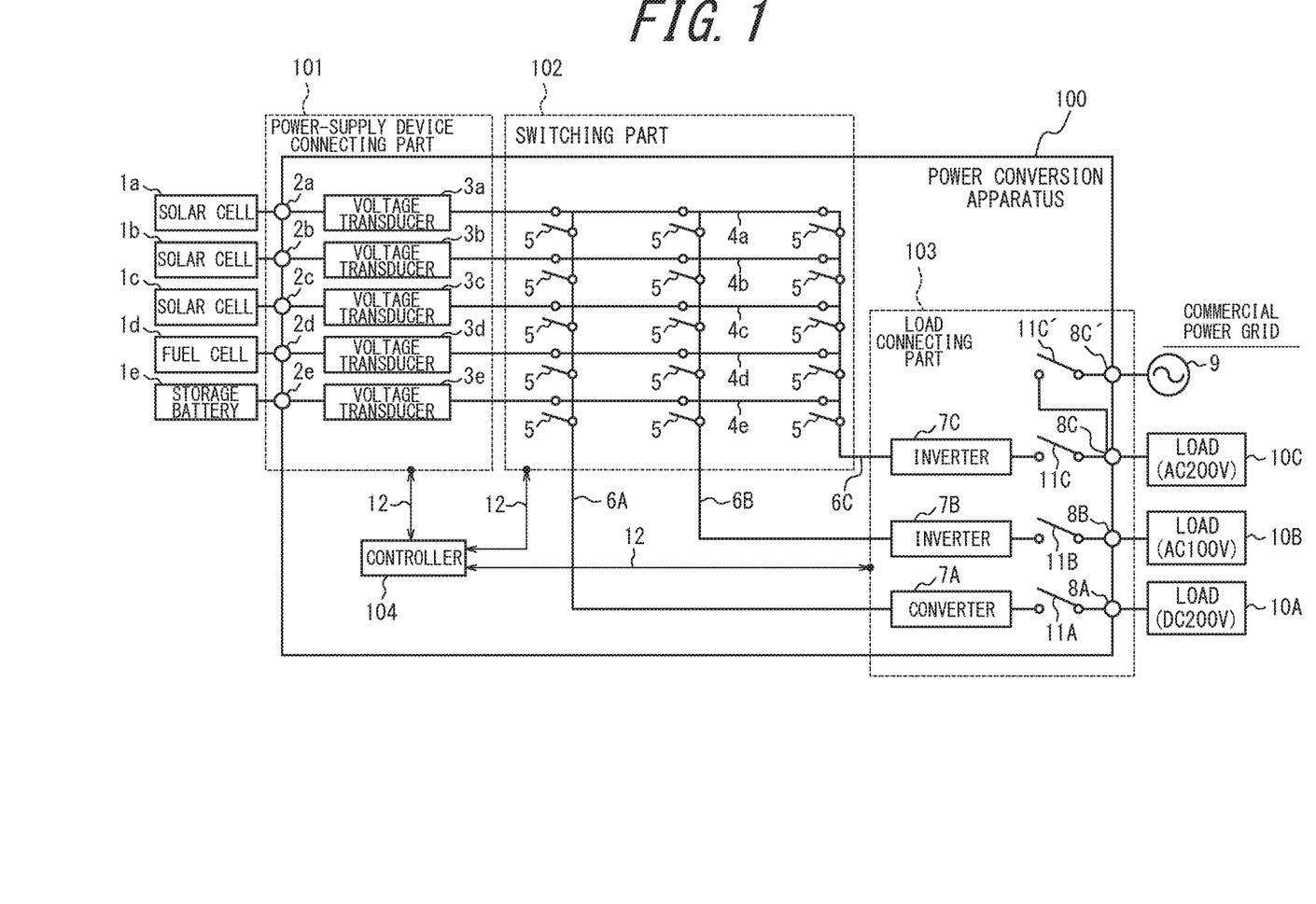
FIG. 1 is a block diagram illustrating a configuration of a power conversion apparatus according to an embodiment disclosed herein.

FIG. 1 is a block diagram illustrating a configuration of a power conversion apparatus 100 according to an embodiment disclosed herein. The power conversion apparatus 100 according to this embodiment includes: a power-supply device connecting part 101 for connecting a plurality of power-supply devices; a load connecting part 103 for connecting to loads; a switching part 102 for selectively outputting powers input from the respective power-supply devices to either the loads or the power-supply devices; and a controller 104 for controlling the respective components.

First, a configuration and an operation of the power-supply device connecting part 101 are described. The power-supply device connecting part 101 includes power-supply device connection terminals $2a$ to $2e$ for connecting the power-supply devices $1a$ to $1e$ thereto; and voltage transducers $3a$ to $3e$ for converting, to a desired voltage, DC powers input from the power-supply device connection terminals $2a$ to $2e$. The powers stepped up or stepped down by the voltage transducers are output to the power-supply device input lines $4a$ to $4e$.

The power-supply device connection terminals $2a$ to $2e$ may include, in addition to power terminals for inputting/outputting power between each of the power-supply devices and the disclosed power conversion apparatus, a control signal terminal for controlling the power-supply devices by the controller 104. In this embodiment, the power-supply device connection terminals $2a$ to $2c$ are each connected with the power-supply devices $1a$ to $1c$ (solar cells), respectively. The power-supply device connection terminal $2d$ is connected with the power-supply device $1d$ (fuel cell). The power-supply device connection terminal $2e$ is connected with the power-supply device $1e$ (storage battery).

Solar cells convert solar energy into DC power. A solar cell includes, for example, multiple photoelectric conversion cells connected in series so as to output a predetermined current when irradiated with sunlight. In this embodiment, silicon-based polycrystalline solar cells may be used as the solar cells to be connected to the power-supply device connection terminals $2a$ to $2c$. However, the solar cells are not limited thereto, and may employ any type including, for example, silicon-based monocrystalline solar cells or thin-film solar cells such as CIGS cells, with no limitation on the type as long as being capable of photoelectric conversion.

Fuel cells use hydrogen as fuel and generate power through chemical reaction between hydrogen and oxygen in air. Fuel cells are classified into, for example, the solid oxide fuel cell and the polymer electrolyte fuel cell, depending on the material used as the electrolyte. The type of the fuel cell used in this embodiment is not particularly limited.

The storage battery used in this embodiment may employ, for example, a lithium-ion battery. Further, storage batteries of other types, such as a nickel-hydrogen storage battery, may also be used. The storage battery may be used alone or may be mounted on electric vehicles (EV) or plug-in hybrid vehicles (PHV) to be charged.

The voltage transducers 3a to 3e each DC/DC convert DC output voltage of each of the power-supply devices into a predetermined DC voltage value. More specifically, the voltage transducers 3a to 3c each have a DC/DC conversion circuit, and step up, based on a control signal from the controller 104, DC input voltage from each of the power-supply devices to an arbitrary target voltage value, and then output the stepped-up voltage to the power-supply device input lines 4a to 4e.

Here, the voltage transducers 3a to 3e can perform DC/DC conversion in a bidirectional manner. For example, the voltage transducer 3e of FIG. 1 steps up or steps down DC output power from the power-supply device 1e (storage battery), and outputs the power to the power-supply device input line 4e. Further, the voltage transducer 3e may step down or step up DC input power from the power-supply device input line 4e, and supply the power to the power-supply device 1e (storage battery).

The solar cells to be connected to the power-supply device connection terminals 2a to 2c may be supplied with different DC input voltages due to the difference in number of modules connected in series or the difference in installation angles. In such case, the voltage conversion of this embodiment is performed by varying the amount of adjustment according to the DC input voltage, to thereby step up the voltage to the same target voltage value.

The power-supply devices to be connected with the power-supply device connection terminals 2a to 2e include a solar cell, a fuel cell, and a storage battery, and may also include, in addition thereto, a generator such as a wind turbine generator and a small hydroelectric generator which rectify AC power to output.

Next, a configuration and an operation of the switching part 102 are described. The switching part 102 has a plurality of selector switches 5 for selectively outputting, to any of the DC power output lines 6A to 6C, DC input powers (the power-supply device input lines 4a to 4e) from the power-supply devices that have been voltage-converted. The switches are each formed of, for example, a relay switch and a transistor switch, which are adapted to switch ON/OFF state based on a control signal from the controller 104. The controller 104 controls the switching such that the power-supply device input lines 4a to 4e are each connected to only one of the DC power output lines 6A to 6C.

Next, a configuration and an operation of the load connecting part 103 are described. The load connecting part 103 includes converter 7A (DC/DC converter) and invertors 7B, 7C each for converting powers from each of the DC power output lines 6A to 6C, respectively. The load connecting part 103 also includes load connection terminals 8A to 8C for connecting the outputs of the invertors and the converter to the loads.

The converter 7A and the invertors 7B, 7C each convert powers from the DC power output lines 6A to 6C, respectively, into power corresponding to the load connected thereto. In this embodiment, the converter 7A, and the invertors 7B and 7C each convert DC powers from the DC power output lines 6A to 6C into 200 V DC, 100 V AC, and 200 V AC single-phase 3-wire, respectively. The powers converted into 200 V DC, 100 V AC, and 200 V AC are each supplied to either one of the loads 10A to 10C connected to the load connection terminals 8A to 8C, respectively. The converter 7A and the invertors 7B, 7C each convert the power into optimum power corresponding to the connected load as described above, based on a control signal from the controller 104.

The load connection terminals 8A to 8C may include power terminals for inputting/outputting power to and from each load, and may also include a control signal terminal for allowing the controller 104 to control each load. In this embodiment, the load connection terminals 8B and 8C are connected with the loads 10B and 10C each operating at 100 V AC and 200 V AC single-phase 3-wire, respectively. The load connection terminal 8A is connected with a load driven by DC power. Examples of the load 10B that should be connected to 100 V AC may include electric appliances such as a refrigerator, an emergency light, a hot water system, and a domestic network server, in which the occurrence of power failure must be kept to a minimum. The load 10C is a domestic ordinary load driven at 100 V AC supplied by taking out two wires including a neutral-phase wire from among the single-phase 3-wires of 200 V AC. Examples of the load 10C may include a hair dryer, a home video game, and a music audio system.

To supply power to the load 10C, switches 11C, 11C' are switched such that the load 10C may be selectively supplied with power from a commercial power supply system 9 and power from the disclosed power conversion apparatus. The switching is performed based on the voltages of the commercial power supply system 9 and the inverter 7C monitored by the controller 104.

In this embodiment, the load 10B to be connected to an emergency power supply and other domestic ordinary load 10C are connected to different output lines, which however is not limited thereto. For example, the loads 10B, 10C may both be connected to the 200 V AC side and the switches 11C and 11C' may rapidly be switched depending on the voltages of the inverter 7C and the commercial power supply system 9, such that power is supplied to the loads with no intermission.

In this embodiment, a path to be followed by a control signal 12 for controlling each component by the controller 104 is indicated by the solid line of FIG. 1. Here, the control signal may be transmitted through wired or wireless communication.

The controller 104 may be configured by hardware, or may be implemented as a program to be executed by a CPU to thereby realize the function thereof.

The voltage transducers 3a to 3e, the converter 7A and the inverters 7B, 7C in this embodiment are illustrated to control the output voltage by the controller 104, which however is not limited thereto, and may be set up to provide a predetermined output voltage.

Further, in this embodiment, as AC power output, 200 V AC single-phase 3-wire and 100 V AC single-phase are each adapted to be output from the load connection terminals 8C, 8B, respectively. However, 200 V three-phase 3-wire is often used for service refrigerators and air conditioners, and for driving motors in factories, and thus, the inverter 7C may be replaced by an inverter 7C' for converting power into 200 V three-phase. Further, the converter 7A may be replaced by the inverter 7C' and the inverter 7C' may be supplied with power.

This embodiment has been illustrated assuming, as the loads to be connected, electrical appliances domestically available in Japan. However, the embodiment may be modified as appropriate in consideration of the use of electric appliances available outside Japan. For example, the converter 7A may be replaced by an inverter 7A' capable of outputting 220 V to 240 V AC and the inverter 7A' may be supplied with power, so that electric appliances available in Asian, Oceanian, and European regions may also be connected.

(First Power Conversion Mode)

Figure 2:
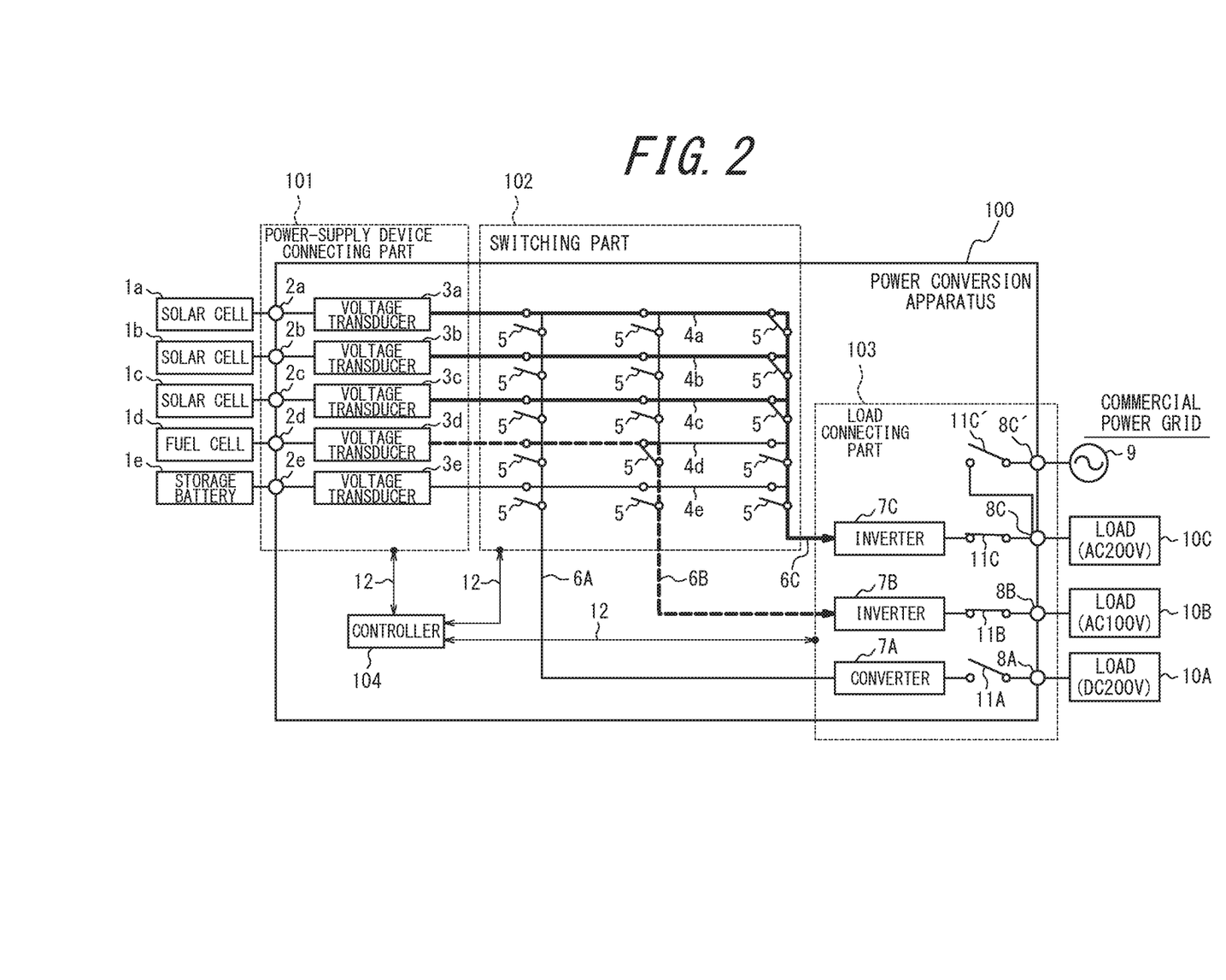
FIG. 2 is a block diagram illustrating the disclosed power conversion apparatus switched to a first power conversion mode.

Next, a first power conversion mode of this embodiment is described. FIG. 2 illustrates the disclosed power conversion apparatus 100 of FIG. 1, which has been switched to the first power conversion mode. Here, in the first power conversion mode, the switches and the components in the power conversion apparatus 100 are controlled to be switched, to thereby drive the load 10C connected to the 200 V AC power supply, using power output from the power-supply devices 1a to 1c (solar cells). Further, in the first power conversion mode, output power from the power-supply device 1d (fuel cell) is used to drive the load 10B connected to 100 V AC power supply.

In this first power conversion mode, the voltage transducers 3a to 3c step up the DC input voltage of about 240 V from the power-supply devices 1a to 1c (solar cells) to an established target voltage value of 370 V, and then output the voltage to the power-supply device input lines 4a to 4c. The voltage transducer 3d steps up the DC input voltage of 160 V from the power-supply device 1d (fuel cell) to 300 V, and then outputs the voltage to the power-supply device input line 4d. No power is output from the power-supply device 1e (storage battery).

The controller 104 controls the switching part 102 such that the power-supply device input lines 4a to 4c from the power-supply devices 1a to 1c (solar cells) are connected to the DC power output line 6C assigned with a target voltage value of 370 V DC. The power-supply device input line 4d from the power-supply device 1d (fuel cell) connects to the DC power output line 6B assigned with a target voltage value of 300 V DC. The power-supply device input line 4e from the power-supply device 1e (storage battery) is configured to be connected to none of the DC power output lines. The bold solid line of FIG. 2 shows a path along which DC powers of the power-supply devices 1a to 1c (solar cells) output from the voltage transducers 3a to 3c are sent to the inverter 7C through switching of the switches 5. Similarly, the bold broken line shows a path along which DC power of the power-supply device 1d (fuel cell) output from the voltage transducer 3d is sent to the inverter 7B.

The voltage values of the DC power output lines 6B, 6C are each adjusted to 300 V DC and 370 V DC, respectively, by the aforementioned voltage transducers 3a to 3d, which may be set to arbitrary voltage values by the controller 104 in accordance with the load etc. connected to the DC power output lines.

Next, the inverter 7C converts power of 370 V DC from the DC power output line 6C into 200 V AC single-phase 3-wire. The power converted into 200 V AC is supplied to the load 10C connected to the load connection terminal 8C. Similarly, the inverter 7B converts power of 300 V DC from the DC power output line 6B into 100 V AC. The power converted into 100 V AC is supplied to the load 10B connected to the load connection terminal 8B. Meanwhile, no power is supplied to the DC power output line 6A, and thus the converter 7A is not caused to operate. The inverters 7B and 7C each convert the power into optimum power corresponding to the connected load as described above, based on a control signal from the controller 104.

Figure 3:
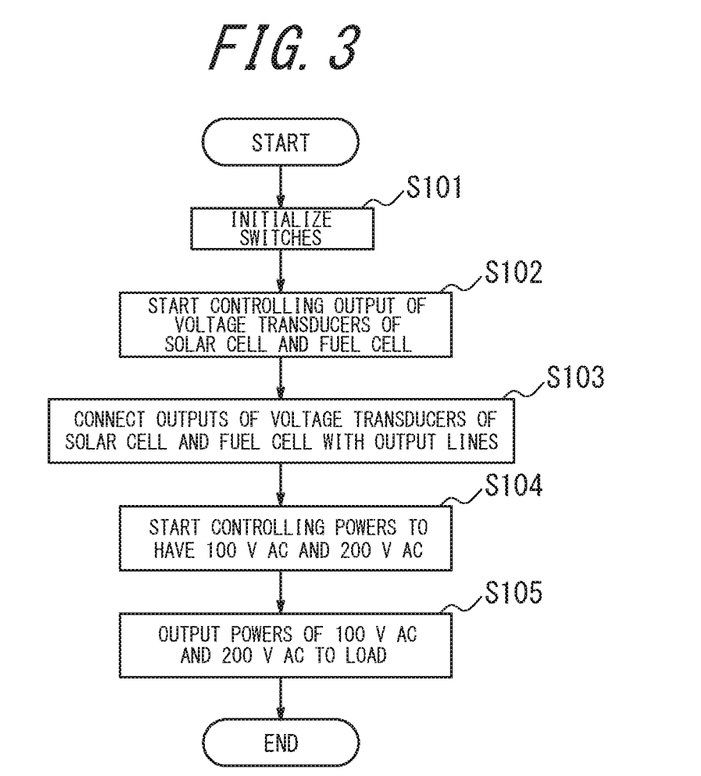
FIG. 3 is a flowchart illustrating a procedure for switching the disclosed power conversion apparatus to the first power conversion mode.

FIG. 3 illustrates, in a flowchart, a procedure for switching to the first power conversion mode. First, the controller 104 initializes the switches 5 so as to disconnect all the connections between the power-supply device input lines and the DC power output line. At the same time, the controller 104 also initializes the switches 11A to 11C so that power output from the converter 7A and the inverters 7B, 7C are not output to the loads 10A to 10C (Step S101). At this time, the switch 11C' may be turned ON so as to supply power from the commercial power-supply system 9 to the load 10C.

Next, the controller 104 controls the voltage transducers 3a to 3d such that the DC output voltages from the voltage transducers 3a to 3c and 3d are each set to the target voltage values of 370 V DC and 300 V DC, respectively (Step S102).

When the DC output voltages from the voltage transducers 3a to 3c and 3d are stabilized, the controller 104 switches the switches 5 so that the power-supply device input lines 4a to 4c and 4d are each connected to the DC power output lines 6C and 6B, respectively (Step S103). At this time, the plurality of switches 5 are controlled in an interlocking manner such that each of the power-supply device input lines will not be connected to the plurality of the DC power output lines simultaneously. In this manner, power supplied to the DC power output lines 6B, 6C is supplied to the inverters 7B, 7C.

The controller 104 controls the inverters 7B, 7C to each output powers of 100 V AC and 200 V AC, respectively (Step S104). Then, the controller 104, determining that the powers output from the inverters 7B, 7C have reached a predetermined voltage range, closes the switches 11B, 11C and opens the switch 11C' so as to supply the loads 10B, 10C with powers output from the inverters 7B, 7C (Step S105).

As described above, in the first power conversion mode of this embodiment, the input lines from the power-supply devices are each configured to be selectively connected to only one of the plurality of the DC power output lines having different set voltages. This configuration allows for flexible operation of supplying power from the power-supply devices only to a specific supply destination. In this power conversion mode in particular, the power-supply devices 1a to 1c (solar cells) of high output voltage are stepped up to as high as 370 V DC which corresponds to output voltage of 200 V AC. On the other hand, the power-supply device 1d (fuel cell) of relatively low output voltage is stepped up to a low voltage of 300 V DC which corresponds to output voltage of 100 V AC. In this manner, the step-up ratio between the voltage transducers may be set to 1 or more and 2 or less, which eliminates the need to provide a multi-stage step-up circuit while reducing the circuit scale of the voltage transducer, allowing for constructing the voltage transducers at low cost.

(Second Power Conversion Mode)

Figure 4:
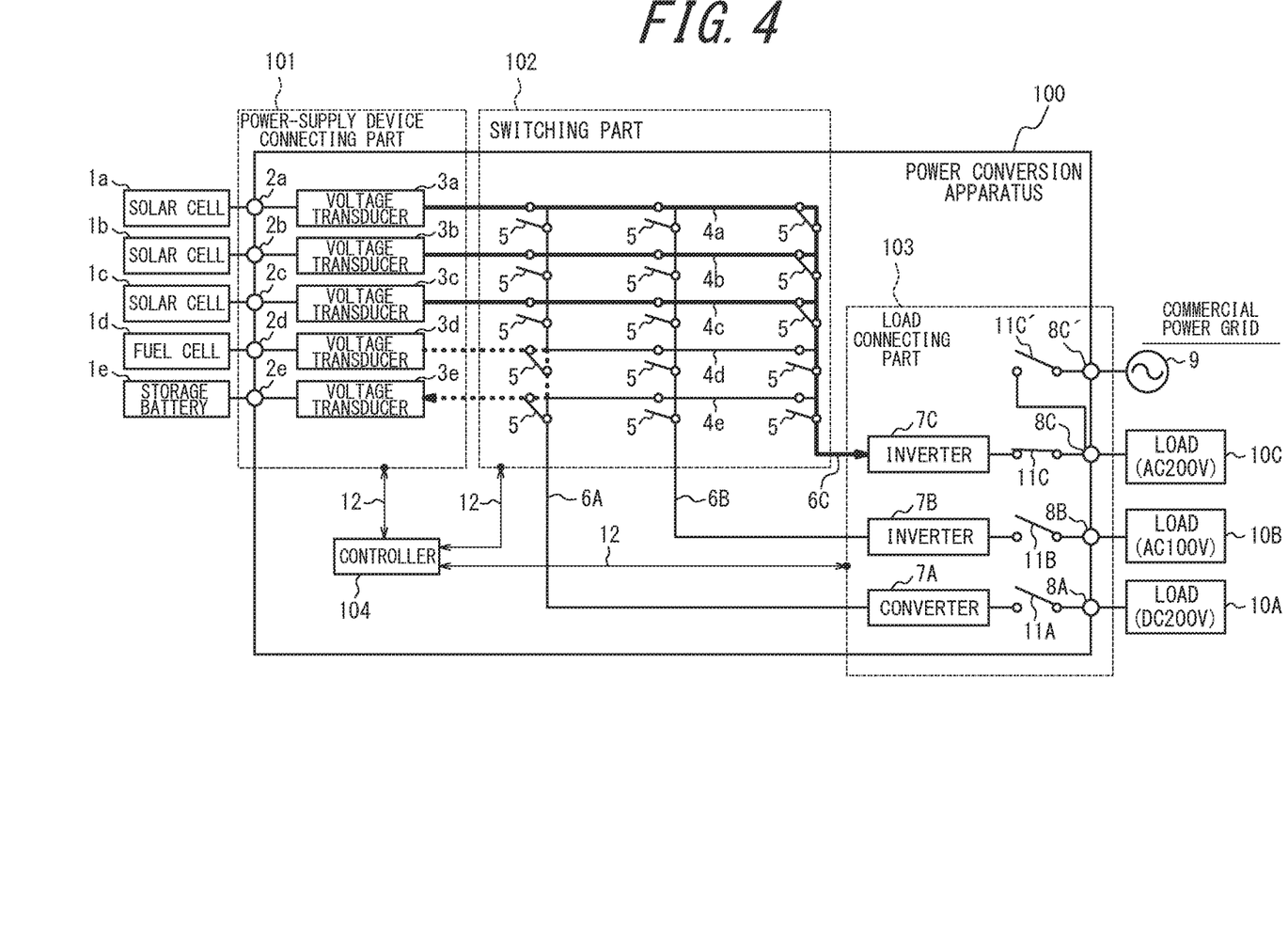
FIG. 4 is a block diagram illustrating the disclosed power conversion apparatus switched to a second power conversion mode.

Next, a second power conversion mode of this embodiment is described. FIG. 4 illustrates the disclosed power conversion apparatus 100 of FIG. 1, which has been switched to the second power conversion mode. Here, in the second power conversion mode, the switches and the components in the power conversion apparatus 100 are controlled to be switched, to thereby drive the load 10C connected to the 200 V AC power supply, using power output from the power-supply devices 1a to 1c (solar cells). Further, in the second power conversion mode, output power from the power-supply device 1d (fuel cell) is used to charge the power-supply device 1e (storage battery).

In the second power conversion mode, the voltage transducers 3a to 3c step up the input voltage of about 240 V DC from each of the power-supply devices 1a to 1c (solar cells) to an established target voltage value of 370 V, and then output the voltage to the power-supply device input lines 4a to 4c. Further, the voltage transducer 3d steps up the input voltage of 160 V DC from the power-supply device 1d (fuel cell) to 240 V, and then outputs the voltage to the power-supply device input lines 4d.

The controller 104 controls the switching part 102 so as to connect the power-supply device input lines 4a to 4c from the power-supply devices 1a to 1c (solar cells) to the DC power output line 6C assigned with a target voltage value of 370 V DC. Similarly, the controller 104 connects the power-supply device input line 4d from the power-supply device 1d (fuel cell) to the DC power output line 6A assigned with a target voltage of 240 V DC. In this embodiment, the power-supply device input line 4e of the power-supply device 1e (storage battery) is controlled to be also connected to the DC power output line 6A, similarly to the fuel cell. The bold solid line of FIG. 4 shows a path along which DC powers of the power-supply devices 1a to 1c (solar cells) output from the voltage transducers 3a to 3c are sent to the inverter 7C through switching of the switches 5. Similarly, the bold broken line shows a path along which DC power of the power-supply device 1d (fuel cell) output from the voltage transducer 3d is input to the voltage transducer 3e.

The voltage transducer 3e is capable of performing DC/DC conversion in a bidirectional manner. The controller 104 controls the voltage transducer 3e so as to step down to 190 V the power to be supplied, from the power-supply device 1d (fuel cell), to the power-supply device input line 4e connected to the DC power output line 6A.

When the power stepped down by the voltage transducer 3e is stabilized, the controller 104 controls the power-supply device 1e (storage battery) so as to charge the power from the fuel cell.

The inverter 7C converts DC output power of the solar cell from the DC power output line 6C into power corresponding to the connected load. In this embodiment, the inverter 7C converts power of 370 V DC from the DC power output line 6C into 200 V AC single-line 3-wire. The power thus converted into 200 V AC is supplied to the load 10C connected to the load connection terminal 8C. Meanwhile, no power is supplied to the DC power output line 6B, and thus the inverter 7B is not caused to operate. Further, in this embodiment, the converter 7A is not caused to operate either despite that power is supplied to the DC power output line 6A, because the power is to be charged in the storage battery. The inverter 7C converts the power into optimum power corresponding to the connected load, based on a control signal from the controller 104.

Figure 5:
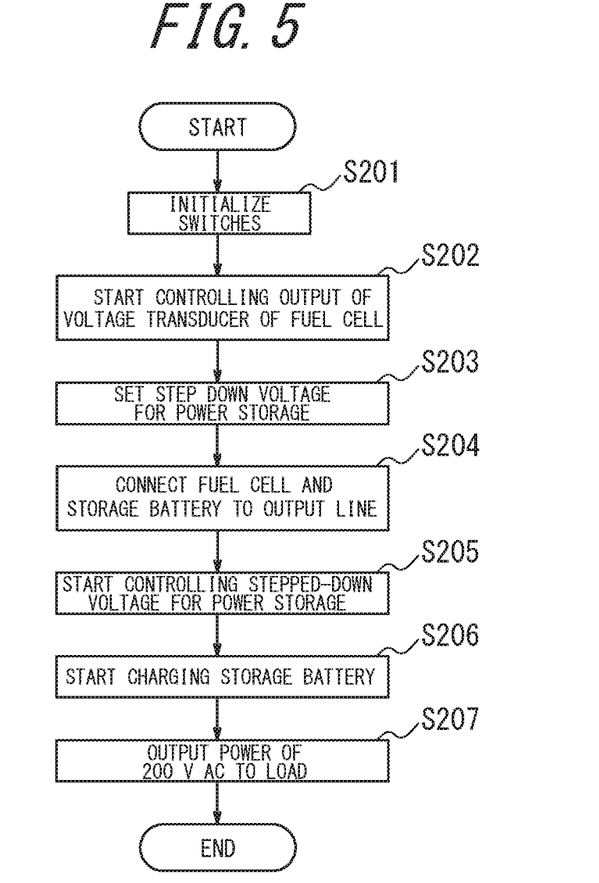
FIG. 5 is a flowchart illustrating a procedure for switching the disclosed power conversion apparatus from the first power conversion mode to the second power conversion mode.

FIG. 5 illustrates, in a flowchart, a procedure for switching from the first power conversion mode to the second power conversion mode. First, the controller 104 initializes some of the switches 5 so as to disconnect the connection between the power-supply device input line 4d from the fuel cell and the DC power output line 6B. At the same time, the controller 104 also initializes the switches 11A to 11C so that power output from of the converter 7A and the inverters 7B, 7C are not output to the loads 10A to 10C (Step S201).

Next, the controller 104 controls the voltage transducer 3d so as to have the output power of 240 V DC (Step S202), and further, sets the voltage transducer 3e to step down power of 240 V DC to 190 V DC (Step S203).

When the voltage value of the power-supply device input line 4d is stabilized, the controller 104 switches the switches 5 so that the power-supply device input lines 4d, 4e are connected to the DC power output line 6A (Step S204).

The controller 104 starts controlling the voltage transducer 3e such that the output thereof falls within a predetermined voltage range (Step S205). Then, the controller 104, when determining that the output has reached a predetermined range, starts charging the power-supply device 1e (storage battery) with the DC output power of the voltage transducer 3e (Step S206). Further, the controller 104 turns ON the switch 11C so as to supply the load 10C with power output from the inverter 7C (Step S207).

As described above, the first power conversion mode may be switched to the second power conversion mode in this embodiment so that the power that has been supplied from the fuel cell to the load 10B of 100 V AC may be switched to be supplied to the storage battery. This type of switching is effective in increasing the charge amount in the storage battery in preparation for autonomous operation, when no power is consumed by the load 10B. In the second power conversion mode as well, the power-supply devices 1a to 1c (solar cells) of high DC output voltage are stepped up to as high as 370 V DC which corresponds to output power of 200 V AC. On the other hand, the power-supply device 1d (fuel cell) of relatively low output voltage is stepped up to 240 V DC which is low enough to be charged into the power-supply device 1e (storage battery). In this manner, the step-up ratio between the voltage transducers may be set to 1 or more and 2 or less, which eliminates the need to provide a multi-stage step-up circuit while reducing the circuit scale of the voltage transducer, allowing for constructing the voltage transducers at low cost. Further, DC power from the fuel cell may directly be charged into the storage battery, which can reduce loss in conversion upon charging as compared the conventional charging via an inverter.

(Third Power Conversion Mode)

Figure 6:
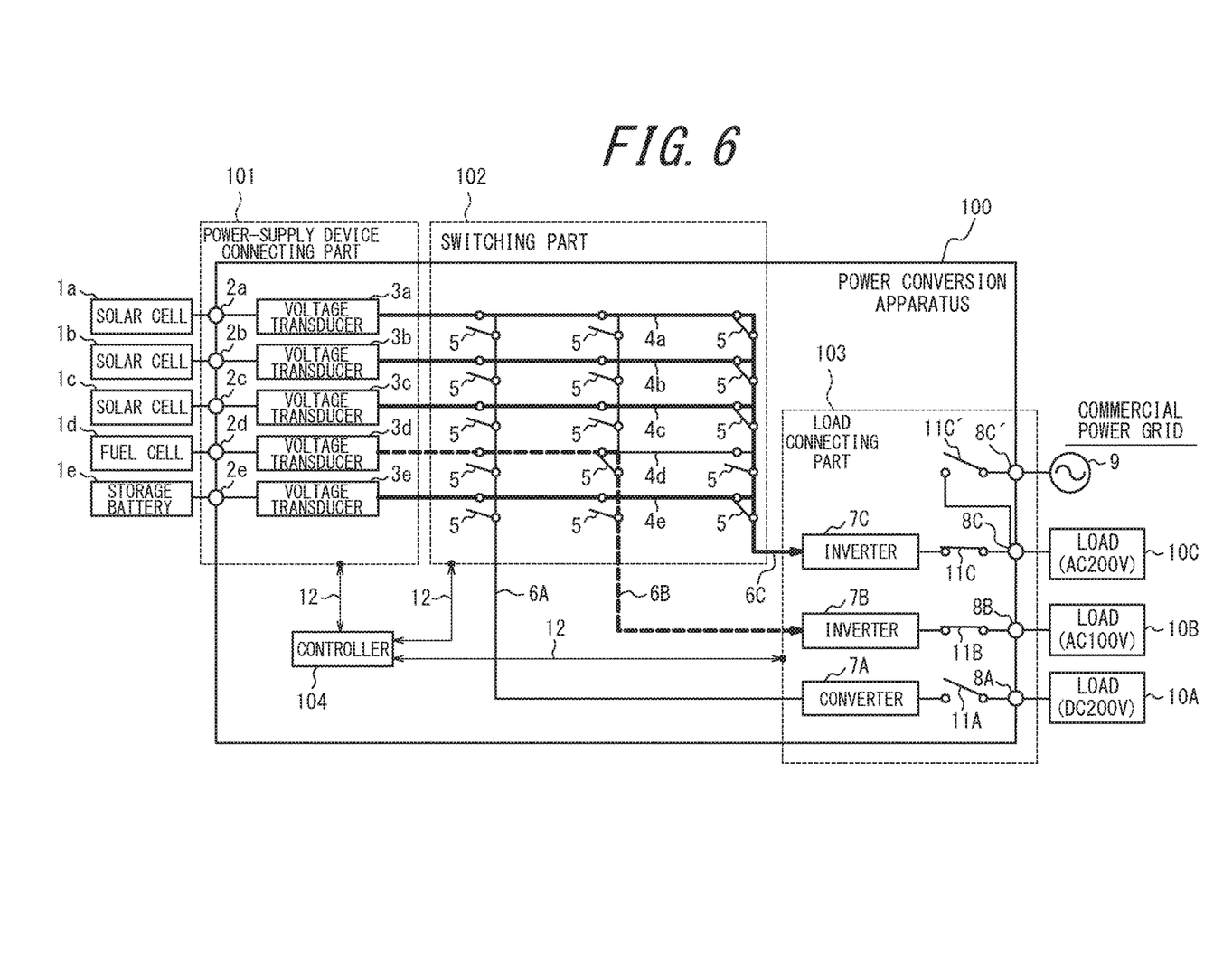
FIG. 6 is a block diagram illustrating the disclosed power conversion apparatus switched to a third power conversion mode.

Next, a third power conversion mode of this embodiment is described. FIG. 6 illustrates the disclosed power conversion apparatus 100 of FIG. 1, which has been switched to the third power conversion mode. Here, in the third power conversion mode, the switches and the components in the power conversion apparatus 100 are controlled to be switched, to thereby drive the load 10C connected to the 200 V AC power supply, using DC power output from the power-supply devices 1a to 1c (solar cells) and the power-supply device 1e (storage battery). Further, in the third power conversion mode, the load 10B connected to the 100 V AC power supply is driven, using DC power output from the power-supply device 1d (fuel cell).

In the third power conversion mode, the voltage transducers 3a to 3c step up DC input voltage of about 240V from each of the power-supply devices 1a to 1c (solar cell) to a target voltage value of 370 V, and then output the voltage to the power-supply device input lines 4a to 4c. Further, the voltage transducer 3d steps up DC input voltage of 160 V from the power-supply device 1d (fuel cell) to 300 V, and then outputs the voltage to the power-supply device input line 4d. Further, the voltage transducer 3e steps up DC input voltage of 190 V from the power-supply device 1e (storage battery) to 370 V, and then outputs the voltage to the power-supply device input line 4e.

The controller 104 controls the switching part 102 such that the power-supply device input lines 4a to 4c supplied with DC power from the power-supply devices 1a to 1c (solar cells) are connected to the DC power output line 6C. Further, the power-supply device input line 4d supplied with DC power from the power-supply device 1d (fuel cell) is connected to the DC power output line 6B. The power-supply device input line 4e supplied with DC power from the power-supply device 1e (storage battery) is controlled to be connected to the DC power output line 6C. The bold solid line of FIG. 6 shows a path along which DC powers of the power-supply devices 1a to 1c (solar cell) and 1e (storage battery) output from the voltage transducers 3a to 3c, and 3e are sent to the inverter 7C through switching of the switches 5. Similarly, the bold broken line shows a path along which DC power of the power-supply device 1*d* (fuel cell) output from the voltage transducer 3*d* is sent to the inverter 7B.

The inverter 7C converts power of 370 V DC supplied from the DC power output line 6C into 200 V AC single-phase 3-wire. The power thus converted into 200 V AC is supplied to the load 10C connected to the load connection terminal 8C. The inverter 7B converts power of 300 V DC supplied from the DC power output line 6B into 100 V AC. The power thus converted into 100 V AC is supplied to the load 10B connected to the load connection terminal 8B. Meanwhile, no power is supplied to the DC power output line 6A, and thus the converter 7A is not caused to operate. The inverters 7B and 7C each convert the power into optimum power corresponding to the connected load, based on a control signal from the controller 104.

Figure 7:
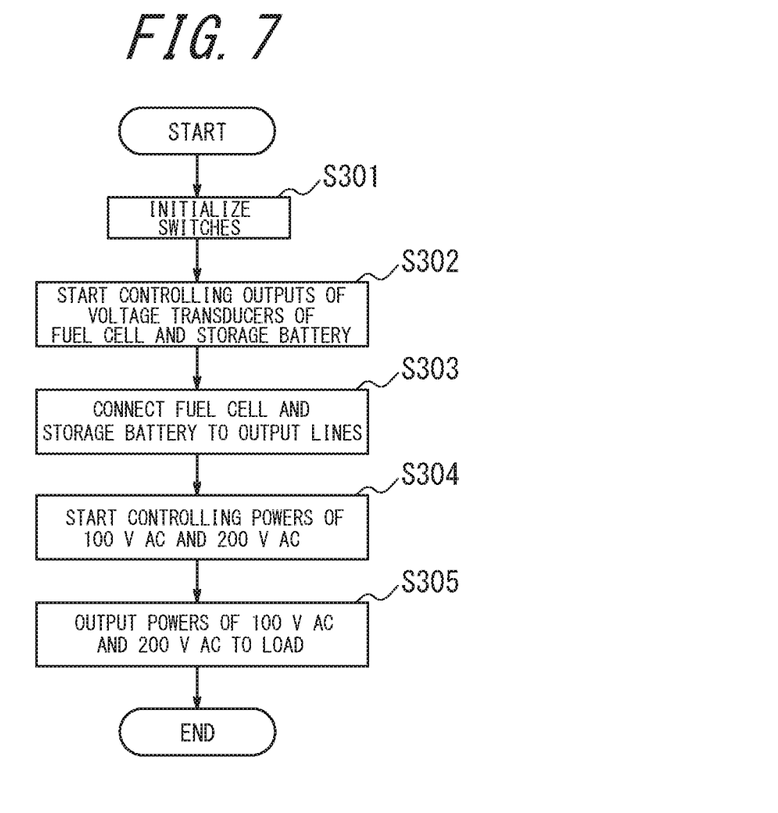
FIG. 7 is a flowchart illustrating a procedure for switching the disclosed power conversion apparatus from the second power conversion mode to the third power conversion mode.

FIG. 7 illustrates, in a flowchart, a procedure for switching from the second power conversion mode to the third power conversion mode. First, the controller 104 initializes some of the switches 5 so as to disconnect the connection between the power-supply device input lines 4*d*, 4*e* each from the fuel cell and the storage battery, respectively, and the DC power output line 6A. At the same time, the controller 104 also initializes the switches 11A to 11C so that power output from the converter 7A and the inverters 7B, 7C are not output to the loads 10A to 10C (Step S301).

Next, the controller 104 controls the voltage transducers 3*d*, 3*e*, such that the DC output voltages of the voltage transducers 3*d*, 3*e* are each controlled to a target voltage value of 300 V DC and 370 V DC, respectively (Step S302).

When the voltage values of the power-supply device input lines 4*d*, 4*e* are stabilized, the controller 104 switches the switches 5 so that the power-supply device input lines 4*d*, 4*e* are each connected to the DC power output lines 6B and 6C, respectively (Step S303). At this time, the plurality of switches 5 are controlled in an interlocking manner such that each of the power-supply device input lines will not be connected to the plurality of the DC power output lines simultaneously. In this manner, power supplied to the DC power output line 6B is supplied to the inverter 7B, and power supplied to the DC power output line 6C is supplied to the inverter 7C.

The controller 104 controls the inverter 7C to output power of 200 V AC and the inverter 7B to output power of 100 V AC (Step S304). Then, the controller 104, determining that the powers output from the inverters 7B, 7C each have reached a predetermined voltage range, closes the switches 11B, 11C so as to supply the loads 10B, 10C with powers output from the inverters 7B, 7C (Step S305).

As described above, the second power conversion mode of this embodiment is switched to the third power conversion mode, so that the DC output power of the storage battery is added to the DC output powers of the power-supply devices 1*a* to 1*c* (solar cells) to thereby obtain output power of 200 V AC. In this manner, the power charged in the storage battery in the second power conversion mode may be used, for example, to supplement a shortage and instability of output power of the solar cells which may result from unstable solar irradiation and other factors. As a result, power can be stably supplied irrespective of the solar irradiation. Further, as in the first and second power conversion modes, the step-up ratio between the voltage transducers may be set to 1 or more and 2 or less, which eliminates the need to provide a multi-stage step-up circuit, allowing for constructing the voltage transducers at low cost.

(Fourth Power Conversion Mode)

Figure 8:
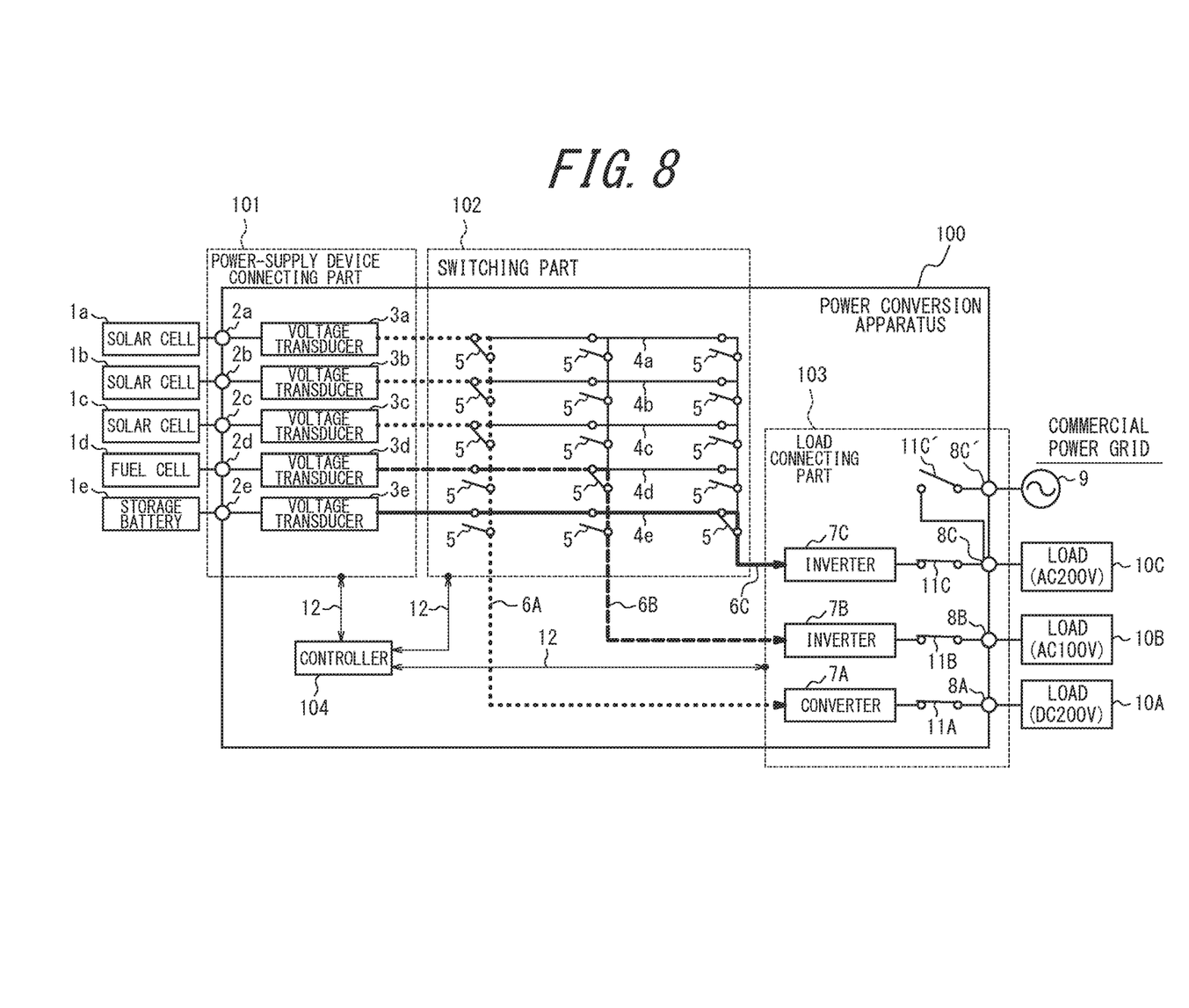
FIG. 8 is a block diagram illustrating the disclosed power conversion apparatus switched to a fourth power conversion mode.

Next, a fourth power conversion mode of this embodiment is described. FIG. 8 illustrates the disclosed power conversion apparatus 100 of FIG. 1, which has been switched to the fourth power conversion mode. Here, in the fourth power conversion mode, the switches and the components in the power conversion apparatus 100 are controlled to be switched, to thereby drive the load 10A connected to the 200 V DC power supply, using powers output from the power-supply devices 1*a* to 1*c* (solar cells). In the fourth power conversion mode, the output power from the power-supply device 1*d* (fuel cell) is used to drive the load 10B connected to 100 V AC power supply. Further, in the fourth power conversion mode, output power from the power-supply device 1*e* (storage battery) to drive the load 10C connected to 200 V AC power supply.

In the fourth power conversion mode, the voltage transducers 3*a* to 3*c* control the input power from each of the power-supply devices 1*a* to 1*c* (solar cells) to be maximum and outputted as 240 V DC, and then output the input power to the power-supply device input lines 4*a* to 4*c*. Further, the input voltage of 160 V DC supplied from the power-supply device 1*d* (fuel cell) is stepped up to 300 V DC by the voltage transducer 3*d* and output to the power-supply device input line 4*d*. Further, the input voltage of 190 V DC supplied from the power-supply device 1*e* (storage battery) is stepped up to 370 V DC by the voltage transducer 3*e* and output to the power-supply device input line 4*e*.

The controller 104 connects, to the DC power output line 6A, the power-supply device input lines 4*a* to 4*c* which are supplied with powers from the power-supply devices 1*a* to 1*c* (solar cells). Further, the controller 104 connects, to the DC power output line 6B, the power-supply device input line 4*d* which is supplied with power from the power-supply device 1*d* (fuel cell). Further, the controller 104 controls to connect, to the DC power output line 6C, the power-supply device input line 4*e* which is supplied with power from the power-supply device 1*e* (storage battery). The bold solid line of FIG. 8 shows a path along which DC power of the power-supply device 1*e* (storage battery) output from the voltage transducer 3*e* is sent to the inverter 7C through switching of the switches 5. Similarly, the bold broken line shows a path along which DC power of the power-supply device 1*d* (fuel cell) output from the voltage transducer 3*d* is sent to the inverter 7B. Further, the bold dotted line shows a path along which DC powers from the power-supply devices 1*a* to 1*c* (solar cells) output from the voltage transducers 3*a* to 3*c* is sent to the converter 7A.

The inverter 7C converts the power of 370 V DC from the DC power output line 6C into 200 V AC single-phase 3-wire. The power thus converted into 200 V AC is supplied to the load 10C connected to the load connection terminal 8C. The inverter 7B converts the power of 300 V DC supplied from the DC power output line 6B, into 100 V AC. The power thus converted into 100 V AC is supplied to the load 10B connected to the load connection terminal 8B. The converter 7A converts power of 240 V DC supplied from the DC power output line 6A, into 200 V DC. The power thus converted into 200 V DC is supplied to the load 10A connected to the load connection terminal 8A. The converter 7A and the inverters 7B, 7C each convert the power into optimum power corresponding to the connected load, based on a control signal from the controller 104.

Figure 9:
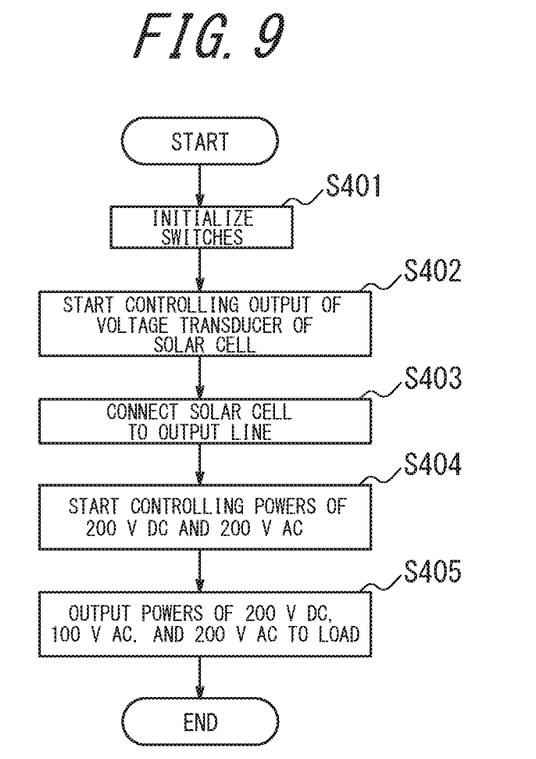
FIG. 9 is a flowchart illustrating a procedure for switching the disclosed power conversion apparatus from the third power conversion mode to the fourth power conversion mode.

FIG. 9 illustrates, in a flowchart, a procedure for switching from the third power conversion mode to the fourth power conversion mode. First, the controller 104 initializes some of the switches 5 so as to disconnect the connection between the power-supply device input lines 4*a* to 4*c* from the solar cell and the DC power output line 6C. At the same time, the controller 104 also initializes the switches 11A to 11C so that powers output from the converter 7A and the inverters 7B, 7C are not output to the loads 10A to 10C (Step S401).

Next, the controller 104 controls the voltage transducers 3a to 3c such that the DC output powers of the voltage transducers 3a to 3c are each controlled to be a target voltage value of 240 V DC (Step S402).

When the voltage values of the power-supply device input lines 4a to 4c are stabilized, the controller 104 switches the switches 5 such that the power-supply device input lines 4a to 4c are each connected to the DC power output line 6A (Step S403). At this time, the plurality of switches 5 are controlled in an interlocking manner such that each of the power-supply device input lines will not be connected to the plurality of the DC power output lines simultaneously. In this manner, power supplied to the DC power output line 6A is supplied to the converter 7A.

The controller 104 controls the converter 7A to output power of 200 V DC and the inverter 7C to output power of 200 V AC (Step S404). Then, the controller 104, determining that the powers output from the inverters 7B, 7C each have reached a predetermined voltage range, closes the switches 11B, 11C so as to supply the loads 10A, 10B, and 10C with powers output from the converter 7A and the inverters 7B, 7C (Step S405).

As described above, the fourth power conversion mode of this embodiment is configured to obtain output power of 200 V AC using DC output from the storage battery, in place of DC output power from the power-supply devices 1a to 1c (solar cells). In this manner, the DC power charged in the storage battery in the second power conversion mode (Embodiment 2) may be used, for example, to cover a power consumption of as large as 200 V AC, when output power of the solar cells should become unstable or run short due to unstable solar irradiation and other factors. In other words, power can be stably supplied irrespective of the solar irradiation. Further, the power may be output as DC power, which is applicable to various devices which would be diversified in the future. Further, as in the first to third power conversion modes, the step-up ratio between the voltage transducers may be set to 1 or more and 2 or less, which eliminates the need to provide a multi-stage step-up circuit, allowing for constructing the voltage transducers at low cost.

Here, during the operation of switching between the power conversion modes, the power supply to all the loads 10A to 10C is once stopped, but the present disclosure is not limited thereto. Only the load that has been changed in power-supply source may be stopped being supplied with power.

Further, during the operation of switching between the power conversion modes, only the switch(es) for changing the connection between the power-supply device input line and the DC power output line is operated to be turned OFF once, but the present disclosure is not limited thereto. All the switches between the power-supply device input line and the DC power output line may be turned OFF once.

In each of the aforementioned first to fourth power conversion modes, the switch 11C' is turned OFF after the operation has been shifted to a steady state, but the present disclosure is not limited thereto. The switch 11C' may be turned ON as appropriate, depending on the excess and deficiency of the power supply from each of the power-supply devices, so to be connected to a commercial power supply system.

The present disclosure has been explained with reference to various drawings and Examples, but it should be noted that a person skilled in the art should readily conceive of various modifications and alterations based on the disclosure. Therefore, such modifications and alterations all fall within the scope of the present disclosure. For example, functions included in the members, the units, and the steps may be re-arranged as long as being theoretically compatible, and a plurality of units and steps may be combined into one or may be divided.

Multiple aspects of the present disclosure are illustrated as a series of operations to be executed by a computer system or other hardware capable of executing program instructions. Examples of the computer system and the other hardware may include, for example, a general purpose computer, a personal computer (PC), a dedicated computer, a workstation, a Personal Communications System (PCS), an RFID receiver, an electrical notepad, a laptop computer, a Global Positioning System (GPS) receiver, and other programmable data processing devices. Note that, in each Embodiment, various operations may be executed through a dedicated circuit installed with program instructions (software) (for example, individual logic gates mutually connected to execute specific functions) or through a logical block or a program module executed by one or more processors. Examples of the one or more processors for executing the logic block and the program module may include, for example, one or more microprocessors, central processing units (CPU), Application Specific Integrated Circuits (ASIC), Digital Signal Processors (DSP), Programmable Logic Devices (PLD), Field Programmable Gate Arrays (FPGA), processors, controllers, microcontrollers, microprocessors, electronic devices, and other devices designed to be capable of executing the functions described herein, and/or a combination of any of those. Embodiments disclosed herein may be implemented by, for example, hardware, software, farm ware, middle ware, a microcode, or a combination of any of those. The instructions may be a program code or a code segment to execute necessary tasks. The instructions may be stored in machine-readable non-temporary storage medium and other media. The code segment may indicate a function, a sub-program, a program, a routine, a sub-routine, a module, a software package, a class or an order, or an arbitrary combination of any of a data structure and a program statement. The code segment may transmit and/or receive information, data parameters, variables or stored content, to and from other code segment or a hardware circuit, to thereby connect the code segment to other code segments or hardware circuits.

The network used herein may include, unless otherwise specified, the Internet, an ad hoc network, a Local Area Network (LAN), a cellular network, Wireless Personal Area Network (WPAN), or other networks, or a combination of any of those. Wireless networks may include, for example, an access point (such as Wi-Fi access point) and a femtocell. Further, wireless communication equipment may be connected to, for example, Wi-Fi, Bluetooth (Registered Trademark), cellular communication technology (e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), and a wireless network using other wireless technology and/or technology standard.

The machine-readable non-temporary storage medium used herein may be configured as a computer-readable tangible carrier (medium) to be categorized as a solid state memory, a magnetic disk, and an optical disk, which stores an appropriate set of computer instructions and a data structure such as a program module for causing a processor to execute the technology disclosed herein. The computer-readable medium may include an electric link including at least one line, a magnetic disk storage medium, a magnetic cassette, a magnetic tape, and other magnetic and optical storage devices (such as, for example, a Compact Disk (CD), a laser disk (registered trademark), a Digital Versatile Disc (DVD) (registered trademark), a floppy (registered trademark) disk, and a blue ray disk (registered trademark)), a portable computer disk, a random access memory (RAM), a read-only memory (ROM), EPROM, EPROM, a rewritable and programmable ROM such as flash memory, and other tangible storage medium capable of storing information, and a combination of any of those. The memory may be disposed inside and/or outside the processor/processing unit. The term "memory" used herein refers to various kinds of long-term storage, short-term storage, volatile, non-volatile, and other memories, without being limited to any specific type or number or the type of the medium for storing the memory.

The system disclosed herein has various modules and/or units for executing specific functions, in which the modules and units are schematically illustrated in order for simply illustrating the functionality thereof, without necessarily indicating specific hardware and/or software. In this regard, these module, units, and other components may be hardware and/or software implemented to substantially execute the specific functions described herein. Various functions of different components may be implemented as hardware and/or software which may be combined or separated, and may be used individually or in combination of any of those. Further, a key board, a display, a touch screen, and a pointing device may be included, but not limited thereto, and input/output/or I/O device or a user interface may be connected to the system directly or via an I/O controller. As described above, the various aspects of the present disclosure may be implemented as various embodiments, which are all included in the scope of the present disclosure.

REFERENCE SIGNS LIST 1a to 1c power-supply device (solar cell)
1d power-supply device (fuel cell)
1e power-supply device (storage battery)
2a to 2e power-supply device connection terminal
3a to 3e voltage transducers
4a to 4e power-supply device input line
5 switch
6A to 6C DC power output line
7A converter
7B, 7C inverter
8A to 8C load connection terminal
9 commercial power supply system
10A to 10C load
11A to 11C, 11C' switch
12 control signal
100 power conversion apparatus
101 power-supply device connecting part
102 switching part
103 load connecting part
104 controller

The invention claimed is:

1. A power conversion apparatus that can be connected with a plurality of DC power-supply devices, comprising:
a plurality of connectors that can detachably be connected with the DC power-supply devices;
a plurality of voltage transducers connected in series with the plurality of connectors;
a plurality of DC power output lines electrically independent from one another;
a switching part allowing for selectively connecting the plurality of voltage transducers and the plurality of DC power output lines with each other; and
a controller configured to control the switching part, according to the operating state of at least either the plurality of DC power-supply devices or loads connected to the plurality of DC power output lines, wherein the controller controls the switching part so that a DC power-supply device of relatively higher output voltage is connected with a DC power output line that requires relatively higher voltage and a DC power-supply device of relatively lower output voltage is connected with a DC power output line that requires relatively lower voltage, so as to maintain the step-up ratios of the plurality of voltage transducers within a predetermined range of values as output voltages of the DC power-supply devices vary over time.

2. The power conversion apparatus according to claim 1, wherein the controller controls the switching part such that each of the plurality of voltage transducers is connected to only one line of any of the plurality of the DC power output lines.

3. The power conversion apparatus according to claim 1, wherein each of the voltage transducers connected to the same DC power output line of the plurality of DC power output lines converts voltage from the DC power-supply devices connected thereto, so as to output the same DC output voltage.

4. The power conversion apparatus according to claim 1, wherein the voltage transducers are controlled such that the voltage transducers connected to different DC power output lines of the plurality of DC power output lines have different DC output voltages.

5. The power conversion apparatus according to claim 1, wherein: when the plurality of DC power-supply devices include a power generation device and a power storage device, the controller controls the switching part to connect the power generation device and the power storage device to the same DC power output line of the plurality of DC power output lines so as to charge power from the power generation device to the power storage device.

6. A method for controlling a power conversion apparatus that can be connected with a plurality of DC power-supply devices, comprising:
a voltage conversion step of voltage-converting output powers of the plurality of DC power-supply devices thus detachably connected;
a connecting step of selectively connecting, to a plurality of DC power output lines, output of the converted voltage converted in the voltage conversion step; and
a switching step of switching the connection between the output of the converted voltage and the plurality of DC power output lines, according to the operating state of at least either the plurality of DC power-supply devices or loads connected to the plurality of DC power output lines, so that a DC power-supply device of relatively higher output voltage is connected with a DC power output line that requires relatively higher voltage and a DC power-supply device of relatively lower output voltage is connected with a DC power output line that requires relatively lower voltage, so as to maintain the step-up ratios of the voltage conversions of the plurality of DC power-supply devices in the voltage conversion step within a predetermined range of values as output voltages of the DC power-supply devices vary over time.

7. The method for controlling a power conversion apparatus according to claim 6, wherein:

the plurality of DC power-supply devices include a power generation device and a power storage device;

the switching step is the step of switching, according to a charge starting operation of the power storage device, the power generation device and the power storage device to be connected to the same DC power output line of the plurality of DC power output lines, the method further comprises a charging step of charging power from the power generation device to the power storage device.

8. The method for controlling a power conversion apparatus according to claim 6, further comprising an initializing step of initializing connection between the output of the converted voltage and the plurality of the DC power output lines.

9. A power conversion system comprising a plurality of DC power-supply devices and a power conversion apparatus, wherein the power conversion apparatus comprises:

a plurality of connectors that can detachably be connected with the DC power-supply devices;

a plurality of voltage transducers connected in series with the plurality of connectors;

a plurality of DC power output lines electrically independent from one another;

a switching part allowing for selectively connecting the plurality of voltage transducers and the plurality of DC power output lines with each other; and a controller configured to control the switching part, according to the operating state of at least either the plurality of DC power-supply devices or loads connected to the plurality of DC power output lines, wherein the controller controls the switching part so that a DC power-supply device of relatively higher output voltage is connected with a DC power output line that requires relatively higher voltage and a DC power-supply device of relatively lower output voltage is connected with a DC power output line that requires relatively lower voltage, so as to maintain the step-up ratios of the plurality of voltage transducers within a predetermined range of values as output voltages of the DC power-supply devices vary over time.

\* \* \* \* \*